(12) United States Patent
Li et al.

(10) Patent No.: US 10,033,565 B2
(45) Date of Patent: Jul. 24, 2018

(54) LOW PEAK-TO-AVERAGE POWER RATIO LONG TRAINING FIELD SEQUENCES

(71) Applicant: Intel IP Corporation, Santa Clara, CA (US)

(72) Inventors: Qinghua Li, San Ramon, CA (US); Xiaogang Chen, Beijing (CN); Yuan Zhu, Beijing (CN); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 14/998,186

(22) Filed: Dec. 26, 2015

(65) Prior Publication Data

US 2017/0033963 A1 Feb. 2, 2017

Related U.S. Application Data

(60) Provisional application No. 62/197,247, filed on Jul. 27, 2015.

(51) Int. Cl.
*H04L 27/26* (2006.01)
(52) U.S. Cl.
CPC ...... *H04L 27/2615* (2013.01); *H04L 27/2613* (2013.01)
(58) Field of Classification Search
CPC . H04L 1/0625; H04L 5/0048; H04L 27/2602; H04L 27/2613; H04L 27/2614;
(Continued)

(56) References Cited

U.S. PATENT DOCUMENTS

| 5,706,290 | A | * | 1/1998 | Shaw | ............... | G06F 9/4887 |
|---|---|---|---|---|---|---|
|  |  |  |  |  |  | 348/586 |
| 6,356,945 | B1 | * | 3/2002 | Shaw | ............... | G06F 9/4887 |
|  |  |  |  |  |  | 348/E5.003 |

(Continued)

FOREIGN PATENT DOCUMENTS

| WO | WO-2015120595 A1 * | 8/2015 | ......... H04L 27/2602 |
|---|---|---|---|
| WO | WO-2016000108 A1 * | 1/2016 | ............ H04L 27/26 |

(Continued)

OTHER PUBLICATIONS

Sun et al., IEEE 802.11-15/0817r0: P Matrix for HE-LTF, Jul. 12, 2015, IEEE.*

(Continued)

*Primary Examiner* — Eric Nowlin
(74) *Attorney, Agent, or Firm* — Patent Capital Group

(57) ABSTRACT

This disclosure describes methods, apparatus, and systems related to a low peak-to-average power ratio (PAPR) long training field (LTF) sequences system. A device may determine a wireless communication channel with a first device in accordance with a wireless communication standard, the wireless communication channel having one or more streams. The device may determine one or more common sequences between the one or more streams. The device may generate a high efficiency preamble in accordance with a high efficiency communication standard. The device may generate one or more LTF sequences included in the preamble based on the one or more common sequences and one or more codes. The device may cause to send the high efficiency preamble over the wireless communication channel.

16 Claims, 8 Drawing Sheets

(58) Field of Classification Search
CPC ............. H04L 27/2621; H04L 27/2666; H04L 27/2615; H04L 27/262; H04L 27/2656; H04B 2201/70701; H04B 2201/70706; H04W 28/065; H04W 52/325
See application file for complete search history.

(56) References Cited

U.S. PATENT DOCUMENTS

| | | | | |
|---|---|---|---|---|
| 7,418,065 | B2* | 8/2008 | Qiu | H04L 27/2666 375/143 |
| 8,331,448 | B2* | 12/2012 | Oguz | H04N 19/176 375/240.13 |
| 8,437,440 | B1* | 5/2013 | Zhang | H04L 1/0625 375/366 |
| 8,879,472 | B2* | 11/2014 | Porat | H04W 72/1231 370/328 |
| 8,917,785 | B2* | 12/2014 | Van Nee | H04L 27/2613 370/334 |
| 9,113,490 | B2* | 8/2015 | Porat | H04W 72/1231 |
| 9,258,163 | B2* | 2/2016 | Yang | H04L 27/2602 |
| 9,300,511 | B2* | 3/2016 | Abraham | H04L 27/2607 |
| 9,407,485 | B2* | 8/2016 | Porat | H04W 72/1231 |
| 9,480,104 | B2* | 10/2016 | Zhang | H04L 5/0048 |
| 9,497,000 | B2* | 11/2016 | Choi | H04L 27/2613 |
| 9,628,310 | B2* | 4/2017 | Lee | H04L 27/26 |
| 9,832,058 | B2* | 11/2017 | Lee | H04L 27/2621 |
| 2006/0067412 | A1* | 3/2006 | Qiu | H04L 27/2607 375/260 |
| 2008/0152005 | A1* | 6/2008 | Oguz | H04N 19/176 375/240.12 |
| 2011/0013583 | A1* | 1/2011 | Yang | H04L 5/0023 370/330 |
| 2011/0013607 | A1* | 1/2011 | Van Nee | H04L 27/2613 370/338 |
| 2011/0194545 | A1* | 8/2011 | Yang | H04L 5/0023 370/338 |
| 2012/0033614 | A1* | 2/2012 | Sampath | H04L 27/2613 370/328 |
| 2012/0170563 | A1* | 7/2012 | Abraham | H04L 27/2607 370/338 |
| 2012/0269124 | A1* | 10/2012 | Porat | H04W 72/1231 370/328 |
| 2012/0269125 | A1* | 10/2012 | Porat | H04W 72/1231 370/328 |
| 2013/0195092 | A1* | 8/2013 | Zhang | H04L 5/0048 370/338 |
| 2013/0230120 | A1* | 9/2013 | Yang | H04L 27/2613 375/295 |
| 2013/0242963 | A1* | 9/2013 | Van Nee | H04L 27/2613 370/338 |
| 2014/0153507 | A1* | 6/2014 | Yang | H04L 27/2602 370/329 |
| 2015/0023272 | A1* | 1/2015 | Choi | H04L 27/2613 370/329 |
| 2015/0095747 | A1* | 4/2015 | Tamo | H03M 13/151 714/781 |
| 2015/0341197 | A1* | 11/2015 | Porat | H04W 72/1231 370/338 |
| 2016/0262139 | A1* | 9/2016 | Porat | H04L 27/2656 |
| 2016/0352556 | A1* | 12/2016 | Zhu | H04B 7/0426 |
| 2016/0380794 | A1* | 12/2016 | Sun | H04L 27/2602 370/328 |
| 2017/0033963 | A1* | 2/2017 | Li | H04L 27/2613 |
| 2017/0041825 | A1* | 2/2017 | Yang | H04W 28/065 |
| 2017/0048882 | A1* | 2/2017 | Li | H04L 5/0037 |
| 2017/0126456 | A1* | 5/2017 | Lee | H04L 1/0072 |
| 2017/0134540 | A1* | 5/2017 | Yang | H04L 69/22 |
| 2017/0230214 | A1* | 8/2017 | Yang | H04L 27/262 |

FOREIGN PATENT DOCUMENTS

WO    WO 2016080785 A1 * 5/2016 ............ H04L 5/0091
WO    WO 2016209622 A1 * 12/2016 ........... H04L 27/2613

OTHER PUBLICATIONS

Chen et al., IEEE 802.11-16/xxxxr0doc.: IEEE 802.11-16/xxxxr02: Changes to D.0.5, May 11, 2016, IEEE.*
Liu et al., Machine Translation of WO 2016000108 A1, Patent Traslate by EPO and Google (Year: 2016).*

* cited by examiner

LOW PEAK-TO-AVERAGE POWER RATIO LONG TRAINING FIELD SEQUENCES

CROSS-REFERENCE TO RELATED APPLICATIONS

This application claims the benefit of U.S. Provisional Application No. 62/197,247 filed Jul. 27, 2015 the disclosure of which is incorporated herein by reference as if set forth in full.

TECHNICAL FIELD

This disclosure generally relates to systems and methods for wireless communications and, more particularly, to a low peak-to-average power ratio (PAPR) long training field (LTF) sequences system in wireless communications.

BACKGROUND

Wireless devices are becoming widely prevalent and are increasingly requesting access to wireless channels. A next generation WLAN, IEEE 802.11ax or High-Efficiency WLAN (HEW), is under development. HEW utilizes Orthogonal Frequency-Division Multiple Access (OFDMA) in channel allocation.

DETAILED DESCRIPTION

Example embodiments described herein provide certain systems, methods, and devices, for providing signaling information to Wi-Fi devices in various Wi-Fi networks, including, but not limited to, IEEE 802.11ax (referred to as HE or HEW).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A long training field (LTF) may be a field utilized for channel estimation, channel training, channel characterization and other functions needed for establishing a channel between a transmitting device and a receiving device. The format of a long training field (LTF) may depend on the communication network and devices used in a network. For example, in a UL MU-MIMO, a specific LTF sequence may be adopted such that receiving devices are able to be trained using this LTF sequence.

Example embodiments of the present disclosure relate to systems, methods, and devices for constructing a training sequence as a part of transmission preamble for LTF sequences that may result in low peak to average power ratios (PAPR). P matrix encoded long training field (LTF) may be adopted for uplink multi-user multi-input multi-output (UL MU-MIMO). A distinct orthogonal code may be applied by each uplink user in frequency domain to mask a common LTF sequence. The orthogonal code may be the row of the 8×8 P matrix. The low PAPR LTF sequences may adapt to the changes in frequency domain masking with the orthogonal code the PAPR of an original LTF sequence. In one embodiment, a P matrix code may be replaced by other codes such as Hadamard code. For low complexity, the binary codes with 1 and −1 entries may be desired, which is consistent with Hadamard code. In one embodiment, orthogonal codes with complex entries such as 8-phase shift keying (8-PSK) constellation points may be used in order to further reduce the PAPR of the masked LTF sequence. It is understood that in 8-PSK, 8 different phase angles may be used to represents bits.

Figure 1:
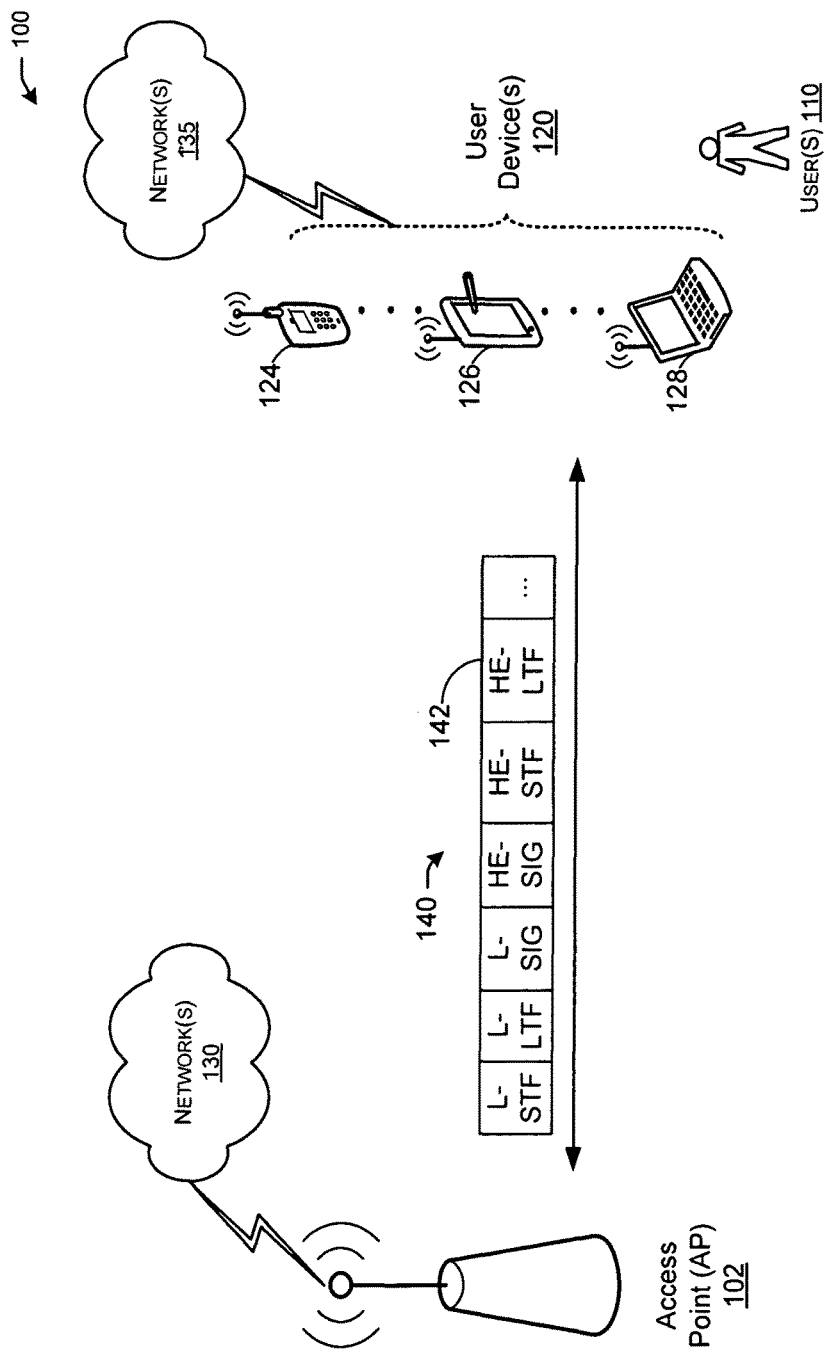
FIG. 1 depicts a network diagram illustrating an example network environment of an illustrative low peak-to-average power ratio (PAPR) LTF sequences system, according to one or more example embodiments of the disclosure.

FIG. 1 is a network diagram illustrating an example network environment, according to some example embodiments of the present disclosure. Wireless network 100 can include one or more user devices 120 and one or more access point(s) (AP) 102, which may communicate in accordance with IEEE 802.11 communication standards, including IEEE 802.11ax (HEW). The user device(s) 120 may be mobile devices that are non-stationary and do not have fixed locations.

Figure 7:
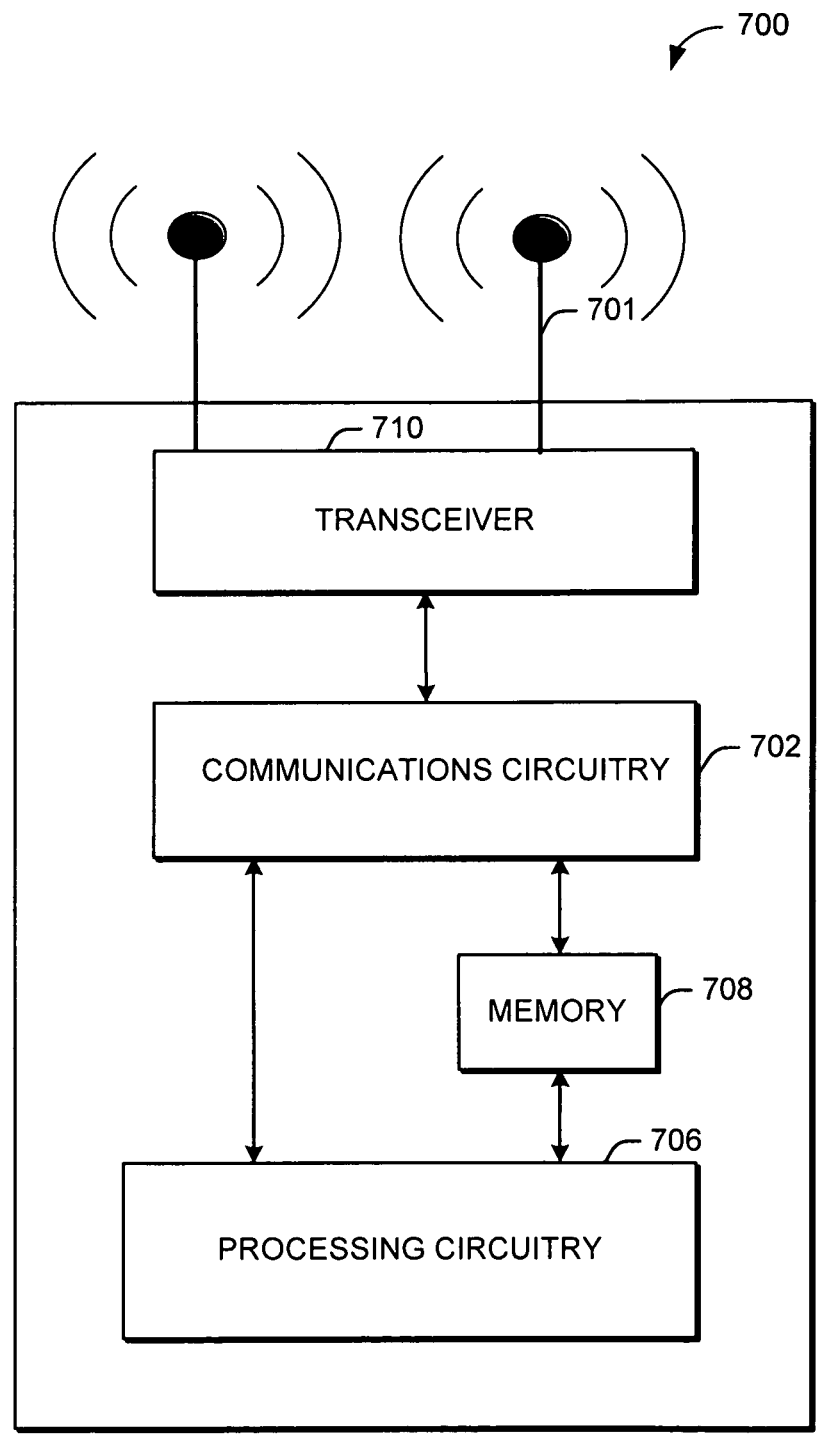
FIG. 7 illustrates a functional diagram of an example communication station that may be suitable for use as a user device, in accordance with one or more example embodiments of the disclosure.
Figure 8:
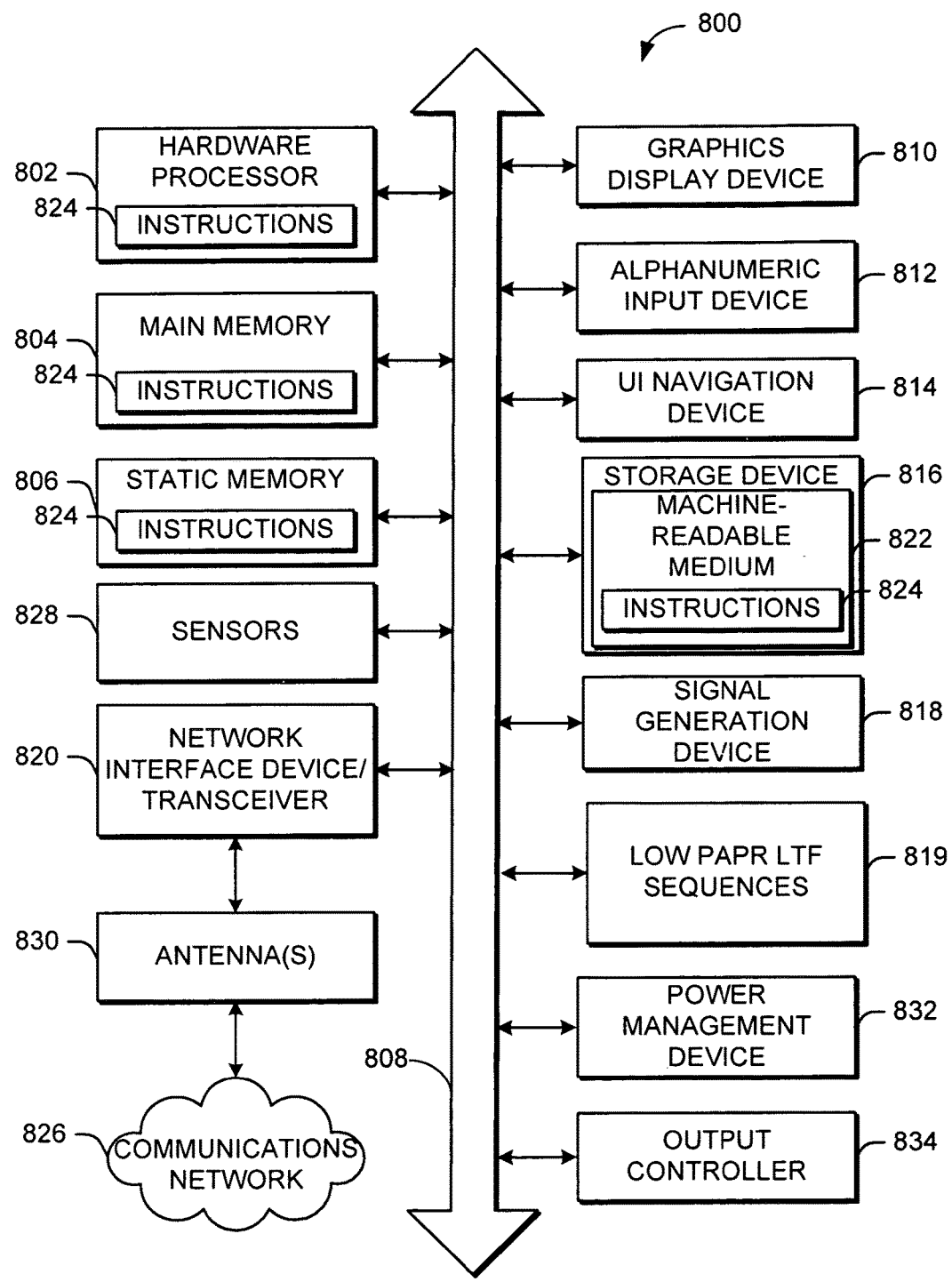
FIG. 8 is a block diagram of an example machine upon which any of one or more techniques (e.g., methods) may be performed, in accordance with one or more embodiments of the disclosure.

In some embodiments, the user devices 120 may include one or more computer systems similar to that of the functional diagram of FIG. 7 and/or the example machine/system of FIG. 8.

One or more illustrative user device(s) 120 may be operable by one or more user(s) 110. The user device(s) 120 (e.g., 124, 126, or 128) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennae. Communications antenna may be any suitable type of antenna corresponding to the communications protocols used by the user device(s) 120 (e.g., user devices 124, 124 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, an HEW preamble (e.g., preamble 140) may include one or more fields, such as, legacy training fields (e.g., legacy short training (L-STF) field and legacy long training (L-LTF) field), legacy signal field (L-SIG), high efficiency signal (HE-SIG) field, high-efficiency short training field (HE-STF), and high efficiency, long training field (HE-LTF) 142, etc. It is understood that the above acronyms may be different and not to be construed as a limitation as other acronyms maybe used for the fields included in an HEW preamble.

Channel or stream training may allow the receiver of data packets (e.g., user device(s) 120) to properly synchronize with the transmitter of the data packets (e.g., AP 102). For example, in the downlink direction bet from AP 102 to one or more user device(s) 120. AP 102 may transmit channel training symbols or fields that may be used to train user device(s) 120 to send and receive data to and from AP 102. Channel training signals may be sent over orthogonal resources separable in time, frequency, and/or code sequence domains In one embodiment, one or more low PAPR LTF sequences may be constructed as a part of a preamble 140. These low PAPR LTF sequences may adapt to the changes in frequency domain masking with the orthogonal code the PAPR of an original LTF sequence. In one embodiment, a P matrix code may be replaced by other codes such as Hadamard code. For low complexity, the binary codes with 1 and −1 entries may be desired, which may be consistent with Hadamard code. In one embodiment, orthogonal codes with complex entries such as 8-phase shift keying (8-PSK) constellation points may be used in order to further reduce the PAPR of the masked LTF sequence. It is understood that in 8-PSK, 8 different phase angles may be used to represents bits. The PAPR may remain the same as the unmasked sequence.

Figure 2:
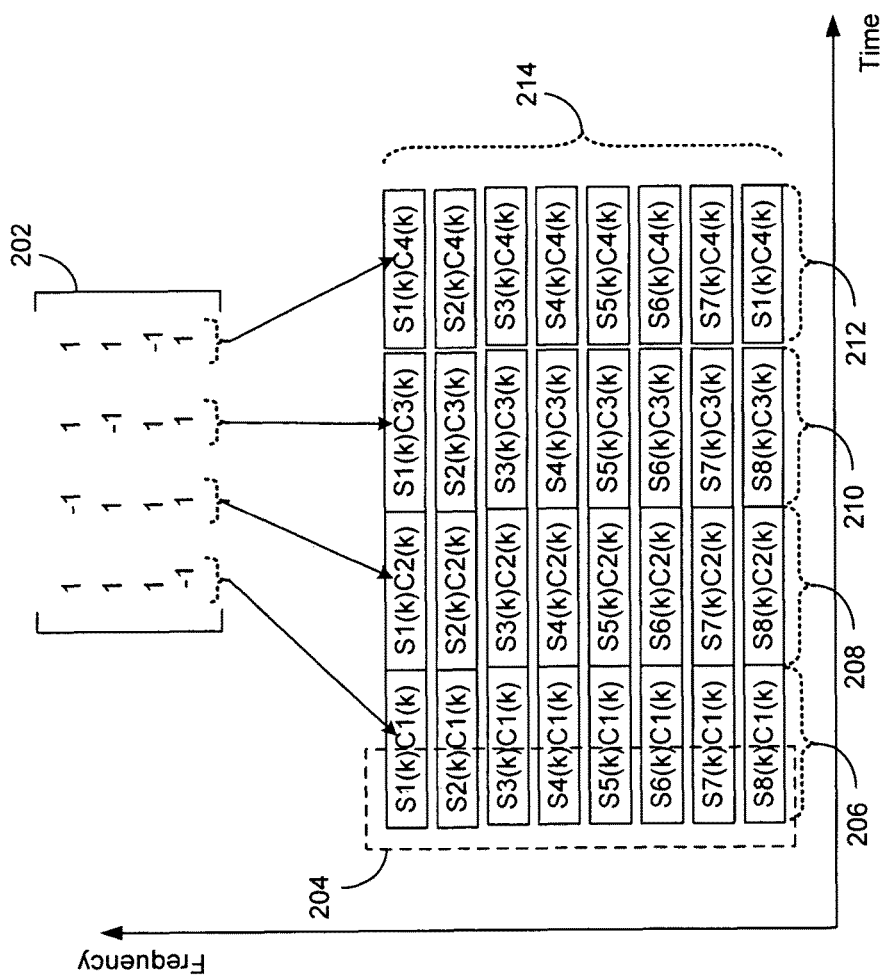
FIG. 2 depicts an illustrative schematic diagram of a low PAPR LTF sequences system, in accordance with one or more example embodiments of the present disclosure.

FIG. 2 depicts an illustrative schematic diagram of a low PAPR LTF sequences system, in accordance with one or more example embodiments of the present disclosure.

A high efficiency (HE) data transmission has a preamble that contains HE-LTF symbols, where the data tones of each HE-LTF symbol are multiplied by entries belonging to a P matrix to enable channel estimation at the receiver and differentiation between the HE-LTF symbols.

One or more subcarriers 214 of a frequency band may be associated with one or more streams during communication between two devices. Each of the one or more streams may have a stream specific LTF sequence. An LTF sequence may be represented by Si (k), where i is the subcarrier index, and k is the stream index. For example, as seen in FIG. 2, the LTF sequence of stream k, is represented by {S1(k), S2(k), S3(k), S4(k), S5(k), S6(k), S7(k), S8(k)}. In order to generate an LTF symbol (e.g., LTF symbols 206, 208, 210 and 212), the LTF sequence for each subcarrier may be multiplied by a predetermined code. For example, the LTF sequence of each subcarrier may be multiplied by entries from a P matrix 202. The entries may be from either the rows or the columns of the P matrix 202. These entries of the P matrix 202 may be represented by codes Cj(k), where j is an LTF symbol index, and k is the stream index. Each row or column of the P matrix 202 may be associated with a specific stream. As a way of example, LTF symbol 206 may be represented by {S1(k)C1(k), S2(k)C1(k), S3(k)C1(k), S4(k)C1(k), S5(k)C1(k), S6(k)C1(k), S7(k)C1(k), S8(k)C1(k)}. Consequently, the masking operation is illustrated in FIG. 2, where a P matrix code is shown across time and stream specific LTF sequence. The P matrix code, e.g., a row of the P matrix, may be applied across time. Each stream may have a distinct LTF sequence in frequency domain for each LTF symbol. The sequence may be generated by masking a common sequence using a row of the 8×8 P matrix. Different streams may use different rows for their masking operations.

Figure 3:
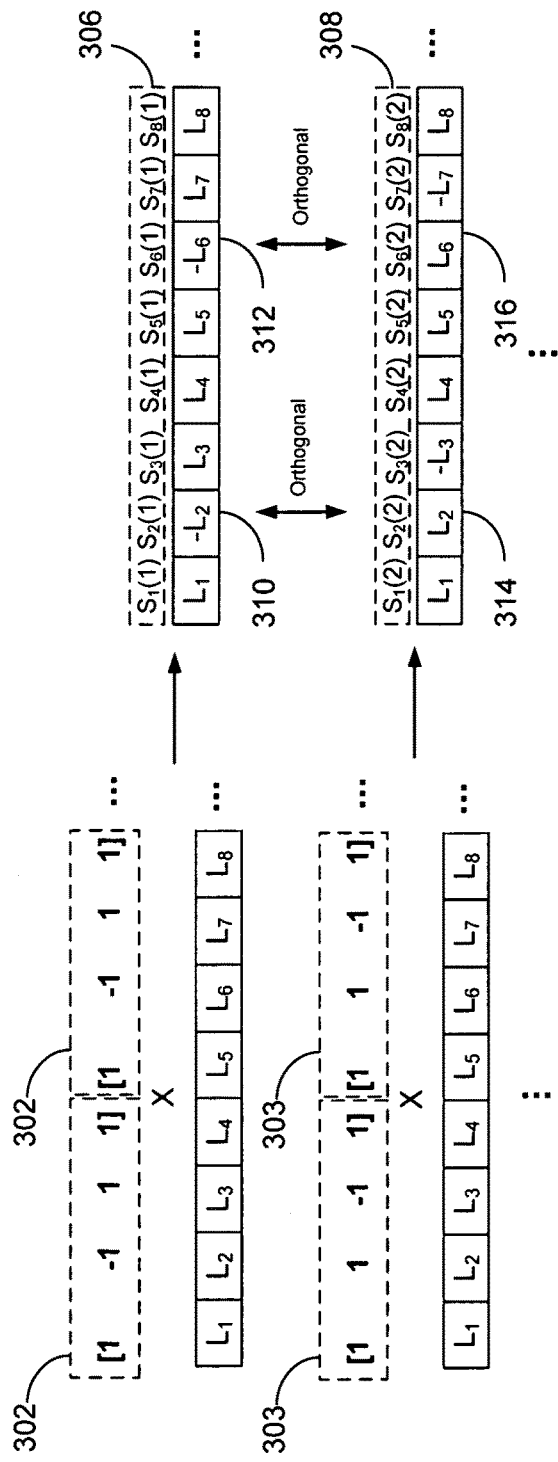
FIG. 3 depicts an illustrative schematic diagram of a low PAPR LTF sequences system, in accordance with one or more example embodiments of the present disclosure.

FIG. 3 depicts an illustrative schematic diagram of a low PAPR LTF sequences system, in accordance with one or more example embodiments of the present disclosure.

In FIG. 3, a construction of stream specific LTF sequences is shown using a P matrix and a common sequence between all the streams. For example, an HE-LTF sequence of a specific stream may be comprised of a sequence that multiplies entries of rows or columns of a P matrix (e.g., P matrix row 302) with the common sequence 304 between all streams (e.g., Li, i representing the subcarrier index).

In one embodiment, in order for the various HE-LTF sequences to be differentiated from each other (e.g., the HE-LTF sequences being orthogonal to each other) each HE-LTF sequence may utilize one or more flipped signs of one or more L values. For example, in HE-LTF sequence 306, the L values may contain two L values with flipped signs (e.g., L values 310, and 312). Each of the HE-LTF sequences may have different L values with flipped signs. For example, HE-LTF 308, may have L values 314 and 316 with flipped signs, resulting in HE-LTF 306 and HE-LTF 308 being orthogonal to each other. It is understood that flipping the sign indicates that flipping a positive value results in a negative value and vice versa.

Figure 4:
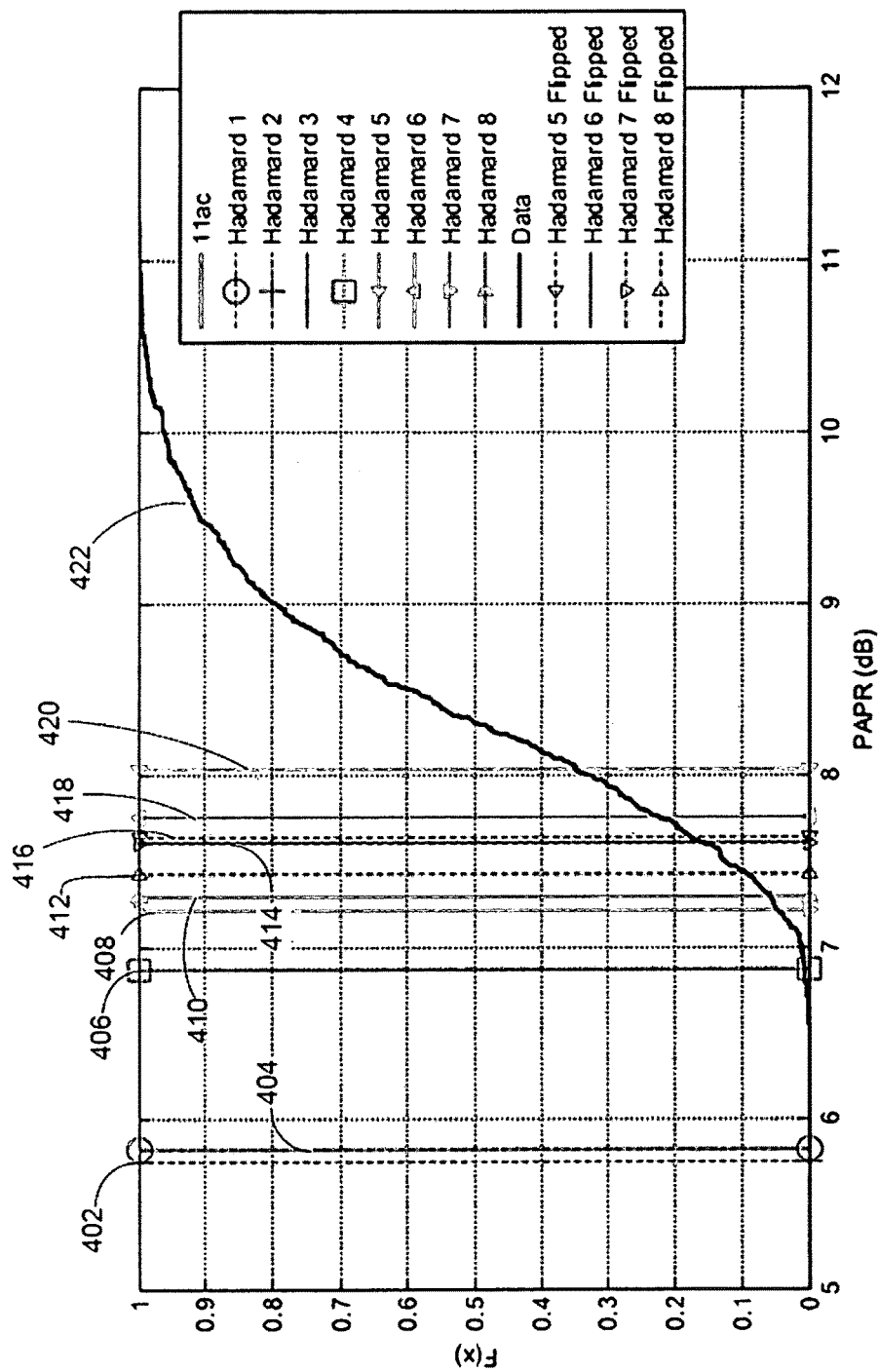
FIG. 4 depicts an illustrative schematic diagram of a low PAPR LTF sequences system, in accordance with one or more example embodiments of the present disclosure.

FIG. 4 depicts an illustrative schematic diagram of a low PAPR LTF sequences system, in accordance with one or more example embodiments of the present disclosure.

In one embodiment, similar to P matrix, Hadamard matrices may also consist of 1 and −1 elements and may also be orthogonal matrices. A Hadamard matrix is a square matrix whose entries are either +1 or −1 and whose rows are mutually orthogonal. Since 1 and −1 may need sign operation at the transmitter and receiver, orthogonal matrices with only 1 and −1 elements may be desirable. For PAPR improvement, the 8×8 P matrix in FIG. 3 may be replaced with and 8×8 Hadamard matrix. The PAPR performance of the Hadamard masking is shown in FIG. 4 as lines 402, 404, 406, 408, 410, 412, 418 and 420. The PAPR of all 8 sequences may be improved by more than 0.5 dB compared to the original design with P matrix codes. The PAPRs of two sequences are almost the same as the PAPR of the IEEE 802.11ac LTF sequence, which may be 5.8 dB. The PAPRs of two sequences is about 6.8 dB. The other four sequences may be between 7.2 and 8.1 dB. Compared to the PARP of the data portion, the PAPRs of 6 sequences are below the data PAPR in 95% cases. The other two are below the data PAPR with 65% chance. Since the transmitter may set the amplifier operation range according to 90% PAPR for the data transmission (e.g., 9.5 dB) the masking of Hadamard codes may meet the requirement. The PAPR of the last four Hadamard codes are above 7 dB.

Figure 5:
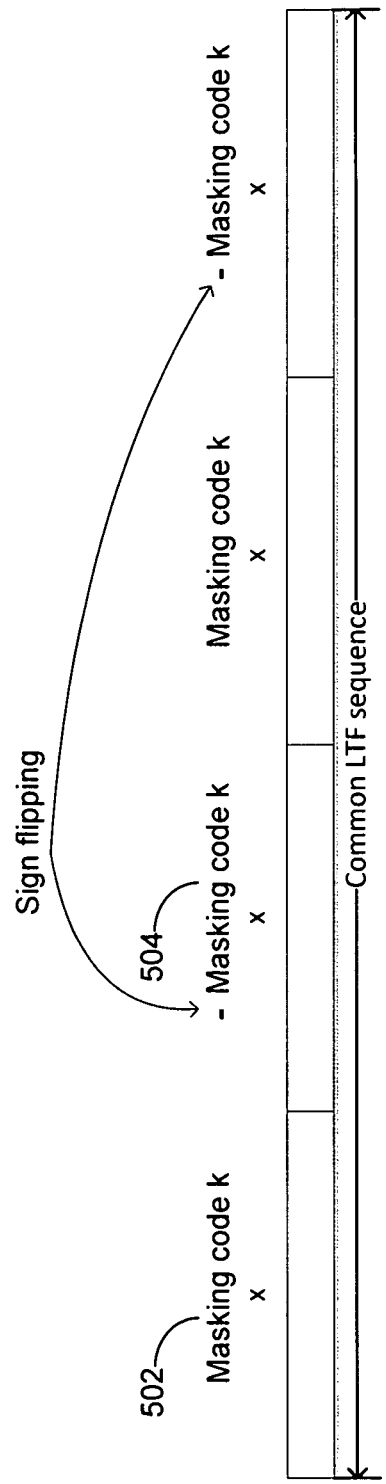
FIG. 5 depicts an illustrative schematic diagram of a low PAPR LTF sequences system, in accordance with one or more example embodiments of the present disclosure.

FIG. 5 depicts an illustrative schematic diagram of a low PAPR LTF sequences system, in accordance with one or more example embodiments of the present disclosure.

In one embodiment, the sign of the Hadamard codes may be flipped to reduce the PAPR as shown in FIG. 5. The sigh of the masking code 502 may be flipped while masking different segments of the common LTF sequence. For example, the sign of Hadamard code may be alternated when masking. Referring back to FIG. 4, sequences 412, 414, and 416 represent PAPR performances using flipped Hadamard codes. It is understood that the Hadamard code is an error-correcting code that is used for error detection and correction when transmitting messages over noisy or unreliable channels. Sequences 404, 410, 418, and 420 may be converted to the sequences 412, 414, and 416. The PAPRs of Hadamard code 5 and 6 may be improved and all the PAPR may be below 7.6 dB or 88% chance below data PAPR. In one embodiment, if sign flipping is used in the masking operation, it may only be used for Hadamard code 5 and 6. These two codes may be defined for the last two LTF sequences, e.g., the 7-th and 8-th sequences such that they are usually not used. Besides the slightly added complexity, the sign flipping may destroy the cyclic orthogonality of the masked LTF sequence.

Since the number of streams for uplink MU-MIMO is usually below 7, the PAPRs of Hadamard codes may be sorted from low to high, may define the sequence indexes in that order, and may assign the masked sequences to the streams. The masked sequences with the lowest PAPR may be assigned first. For example, there may be four uplink streams. The LTF sequences masked by Hadamard code 2, 1, 3, 4 may be used by the four streams for channel training.

In another embodiment, in order to get the same PAPR as the legacy LTF sequence, an orthogonal matrix may be used with elements other than 1 and −1. The implementation complexity may increase. One of the orthogonal matrices that preserve the PAPR performance of the common LTF sequence may be the discrete Fourier transform (DFT) of fast Fourier transform (FFT) matrix. The DFT matrix has a linear phase shift for all the rows. This property helps the masked sequence preserve the PAPR performance. For simplicity, the 8×8 DFT matrix may be used as the orthogonal matrix for masking operation. The rows (or columns) of the DFT matrix may be used to mask the common sequence for generating the actual LTF sequence for each stream or user, respectively. The element of the 8×8 DFT matrix may be written as $$\exp\left(-j\frac{2\pi}{8}mn\right) \text{ or } \exp\left(j\frac{2\pi}{8}mn\right) \text{ or } \frac{1}{\sqrt{8}}\exp\left(-j\frac{2\pi}{8}mn\right),$$

where j is the square root of −1; m is the index of row; n is the index of column; m, n=0, 1, . . . , 7. It is understood that using a DFT matrix as described above is only an example and that other ways of using a DFT matrix may be employed.

Figure 6:
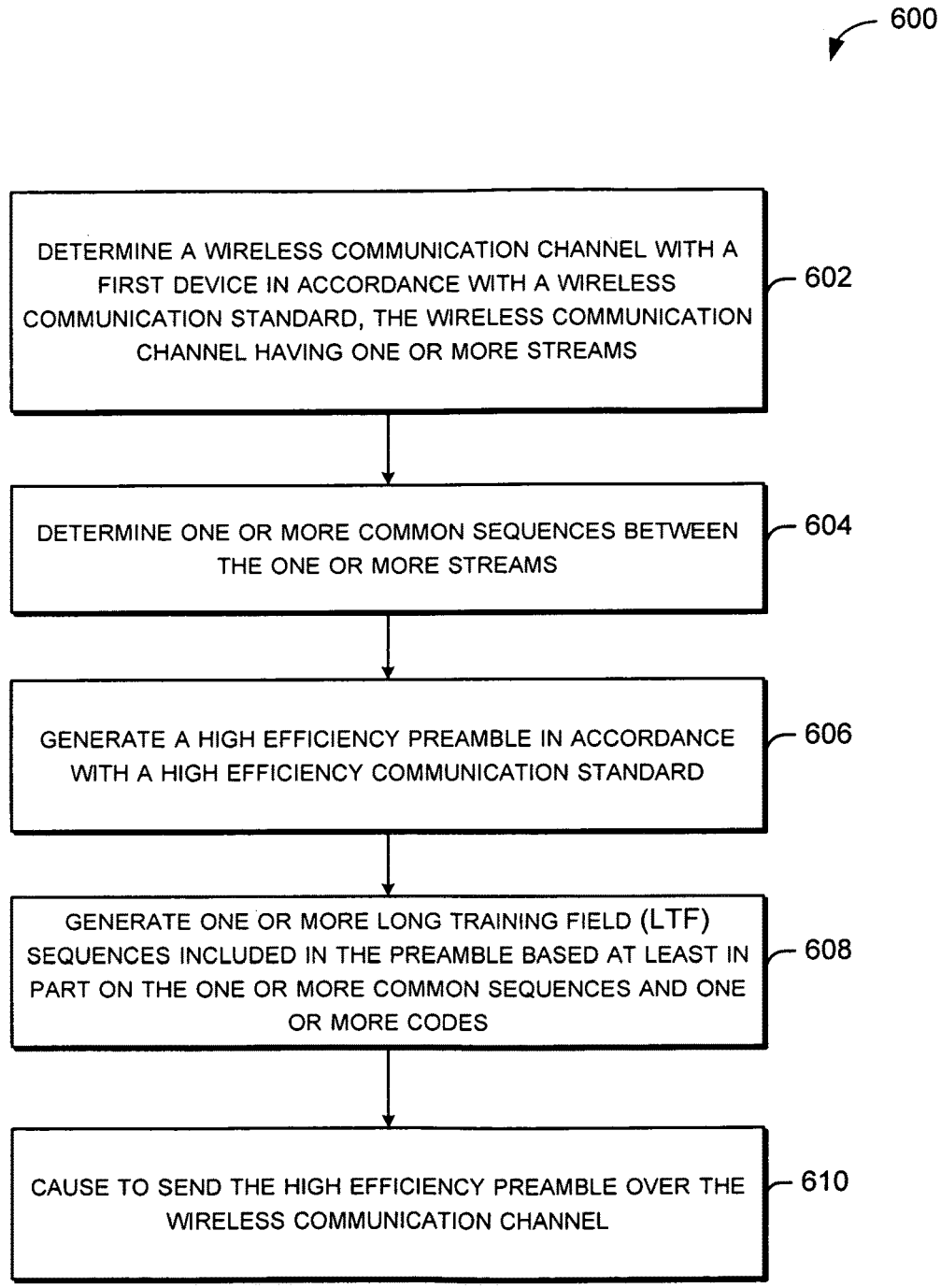
FIG. 6 depicts a flow diagram of an illustrative process for an illustrative low PAPR LTF sequences system, in accordance with one or more embodiments of the disclosure.

FIG. 6 illustrates a flow diagram of illustrative process 600 for a low PAPR LTF sequences system, in accordance with one or more embodiments of the disclosure.

At block 602, a device (e.g., AP 102 and/or user device 120 of FIG. 1) may determine a wireless communication channel with another device (e.g., AP 102 and/or user device 120 of FIG. 1) in accordance with a wireless communication standard, including IEEE 802.11ax. The wireless communication channel having one or more streams. One or more subcarriers of a frequency band may be associated with one or more streams during communication between two devices. Each of the one or more streams may have a stream specific LTF sequence. Channel or stream training may allow the receiver of data packets (e.g., user device(s) 120 of FIG. 1) to properly synchronize with the transmitter of the data packets (e.g., AP 102 of FIG. 1). In order to have low PAPR LTF sequence, the LTF sequence may be masked with orthogonal code of an original LTF sequence.

At block 604, the device may determine one or more common sequences between the one or more streams. For example, a new LTF sequence (e.g., low PAPR LTF sequence) may be generated by masking a common sequence using a row of the 8×8 P matrix. Different streams may use different rows for their masking operations.

At block 606, the device may generate a high efficiency preamble in accordance with a high efficiency communication standard. For example, a high efficiency preamble may include one or more fields, such as, legacy training fields (e.g., legacy short training (L-STF) field and legacy long training (L-LTF) field), legacy signal field (L-SIG), high efficiency signal (HE-SIG) field, high-efficiency short training field (HE-STF), and high efficiency, long training field (HE-LTF), etc.

At block 608, the device may generate one or more long training field (LTF) sequences included in the preamble based at least in part on the one or more common sequences and one or more codes. For example, a long training field (LTF) may be a field utilized for channel estimation, channel training, channel characterization and other functions needed for establishing a channel between a transmitting device and a receiving device. The format of a long training field (LTF) may depend on the communication network and devices used in a network. For example, in a UL MU-MIMO, a specific LTF sequence may be adopted such that receiving devices are able to be trained using this LTF sequence. P matrix encoded long training field (LTF) may be adopted for uplink multi-user multi-input multi-output (UL MU-MIMO). A distinct orthogonal code may be applied by each uplink user in frequency domain to mask a common LTF sequence. The orthogonal code may be the row of the 8×8 P matrix. In other examples, the P matrix code may be replaced by other codes such as Hadamard code. For low complexity, the binary codes with 1 and −1 entries may be desired, which is consistent with Hadamard code. In one embodiment, orthogonal codes with complex entries such as 8-phase shift keying (8-PSK) constellation points may be used in order to further reduce the PAPR of the masked LTF sequence.

In other examples, a new stream of LTF sequences may be generated by using a P matrix and a common sequence between all the streams. For example, and HE-LTF sequence of a specific stream, may be comprised of a sequence that multiplies entries of rows or columns of a P matrix with the common sequence between all streams. This may result in some of the common sequences to have a flipped sign (e.g., −1 or +1). The new common sequence may then be used by multiplying each element of the new common sequence with each element of the original HE-LTF sequence. This may result in a new HE-LTF sequence that may have low PAPR.

At block 610, the device may cause to send the high efficiency preamble over the wireless communication channel. The device and the receiving device may utilize the HE-LTF sequences to train the channel for further data communication between the devices.

FIG. 7 shows a functional diagram of an exemplary communication station 700 in accordance with some embodiments. In one embodiment, FIG. 7 illustrates a functional block diagram of a communication station that may be suitable for use as an AP 102 (FIG. 1) or a user device 120 (FIG. 1) in accordance with some embodiments. The communication station 700 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in FIGS. 2-6.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device may, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a low PAPR LTF sequences device 819, a network interface device/transceiver 820 coupled to antenna(s) 830, and one or more sensors 828, such as a global positioning system (GPS) sensor, compass, accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The low PAPR LTF sequences device 819 may carry out or perform any of the operations and processes (e.g., process 600) described and shown above. For example, the low PAPR LTF sequences device 819 may be configured to construct a training sequence as a part of transmission preamble for low PAPR LTF sequences. The low PAPR LTF sequences may adapt to the changes in frequency domain masking with the orthogonal code the PAPR of an original LTF sequence. In one embodiment, the P matrix code may be replaced by other codes such as Hadamard code. For low complexity, the binary codes with 1 and −1 entries may be desired, which is consistent with Hadamard code. In one embodiment, orthogonal codes with complex entries such as 8-phase shift keying (8-PSK) constellation points may be used in order to further reduce the PAPR of the masked LTF sequence. The PAPR may remain the same as the unmasked sequence. It is understood that in 8-PSK, 8 different phase angles may be used to represents bits.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes (e.g., process 600) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology, known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

A According to example embodiments of the disclosure, there may be a device. The device may include at least one memory that stores computer-executable instructions, and at least one processor of the one or more processors configured to access the at least one memory, wherein the at least one processor of the one or more processors is configured to execute the computer-executable instructions to determine a wireless communication channel with a first device in accordance with a wireless communication standard, the wireless communication channel having one or more streams. The at least one processor of the one or more processors may be configured to execute the computer-executable instructions to determine one or more common sequences between the one or more streams. The at least one processor of the one or more processors may be configured to execute the computer-executable instructions to generate a high efficiency preamble in accordance with a high efficiency communication standard. The at least one processor of the one or more processors may be configured to execute the computer-executable instructions to generate one or more long training field (LTF) sequences included in the preamble based at least in part on the one or more common sequences and one or more codes. The at least one processor of the one or more processors may be configured to execute the computer-executable instructions to cause to send the high efficiency preamble over the wireless communication channel.

The implementations may include one or more of the following features. the at least one processor of the one or more processors is further configured to execute the computer-executable instructions to determine a peak-to-average power ratio (PAPR) based at least in part on the one or more LTF sequences. The one or more codes include, at least in part, orthogonal codes associated with a P matrix. the at least one processor is further configured to execute the computer-executable instructions to determine a first PAPR value for a first stream of the one or more streams based at least in part on a first Hadamard code. The at least one processor of the one or more processors may be configured to execute the computer-executable instructions to determine a second PAPR value for a second stream of the one or more streams based at least in part on a second Hadamard code. The at least one processor of the one or more processors may be configured to execute the computer-executable instructions to sort the first PAPR value and the second PAPR value from low to high. The at least one processor of the one or more processors may be configured to execute the computer-executable instructions to define a sequence for the one or more LTF sequencesbased at least in part on sorting the first PAPR value and the second PAPR value. The one or more codes include, at least in part, a binary code of 1 and a binary code of −1 associated with a Hadamard matrix. Computer-executable instructions to generate the one or more LTF sequences may include computer-executable instructions to generate a first one or more common sequences based at least in part on multiplying each row of the P matrix with the one or more common sequences. Computer-executable instructions to generate a first one or more LTF sequences may include computer-executable instructions to multiply the first one or more common sequences with the one or more LTF sequences. The device may further include a transceiver configured to transmit and receive wireless signals. The device may further include one or more antennas coupled to the transceiver.

According to example embodiments of the disclosure, there may be a non-transitory computer-readable medium storing computer-executable instructions which, when executed by a processor, cause the processor to perform operations. The operations may include determining a wireless communication channel with a first device in accordance with a wireless communication standard, the wireless communication channel having one or more streams. The operations may include determining one or more common sequences between the one or more streams. The operations may include generating a high efficiency preamble in accordance with a high efficiency communication standard. The operations may include generating one or more long training field (LTF) sequences included in the preamble based at least in part on the one or more common sequences and one or more codes. The operations may include causing to send the high efficiency preamble over the wireless communication channel.

The implementations may include one or more of the following features. The operations may include the one or more codes include, at least in part, a binary code of 1 and a binary code of −1 associated with a Hadamard matrix. The computer-executable instructions cause the processor to further perform operations comprising determining a peak-to-average power ratio (PAPR) based at least in part on the one or more LTF sequences. The one or more codes include, at least in part, orthogonal codes associated with a P matrix. The computer-executable instructions cause the processor to further perform operations comprising determining a first PAPR value for a first stream of the one or more streams based at least in part on a first Hadamard code The computer-executable instructions cause the processor to further perform operations comprising determining a second PAPR value for a second stream of the one or more streams based at least in part on a second Hadamard code. The computer-executable instructions cause the processor to further perform operations comprising sorting the first PAPR value and the second PAPR value from low to high. The computer-executable instructions cause the processor to further perform operations comprising defining a sequence for the one or more LTF sequences based at least in part on sorting the first PAPR value and the second PAPR value. The computer-executable instructions to generate the one or more LTF sequences may include operations for generating a first one or more common sequences based at least in part on multiplying each row of the P matrix with the one or more common sequences. The computer-executable instructions to generate the one or more LTF sequences may include operations for multiplying the first one or more common sequences with the one or more LTF sequences.

In example embodiments of the disclosure, there may be a method. The method may include determining a wireless communication channel with a first device in accordance with a wireless communication standard, the wireless communication channel having one or more streams, determining one or more common sequences between the one or more streams, generating a high efficiency preamble in accordance with a high efficiency communication standard, generating one or more long training field (LTF) sequences included in the preamble based at least in part on the one or more common sequences and one or more codes, and causing to send the high efficiency preamble over the wireless communication channel.

Implementations may include one or more of the following features. The one or more codes include, at least in part, orthogonal codes associated with a P matrix. The one or more codes include, at least in part, a binary code of 1 and a binary code of −1 associated with a Hadamard matrix. The method may further include generating a first one or more common sequences based at least in part on multiplying each row of the P matrix with the one or more common sequences. The method may further include determining a first PAPR value for a first stream of the one or more streams based at least in part on a first Hadamard code, determining a second PAPR value for a second stream of the one or more streams based at least in part on a second Hadamard code, and sorting the first PAPR value and the second PAPR value from low to high, and defining a sequence for the one or more LTF sequences based at least in part on sorting the first PAPR value and the second PAPR value. The method may further include determining a peak-to-average power ratio (PAPR) based at least in part on the one or more LTF sequences. The method may further include generating the one or more LTF sequences may include cause operations comprising multiplying the first one or more common sequences with the one or more LTF sequences.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
at least one memory that stores computer-executable instructions; and
one or more processors configured to access the at least one memory, wherein the one or more processors are configured to execute the computer-executable instructions to:
determine a wireless communication channel with a first device in accordance with a wireless communication standard, the wireless communication channel having one or more streams;
determine one or more common sequences between the one or more streams;
generate a preamble in accordance with a high efficiency communication standard;

generate one or more long training field (LTF) sequences included in the preamble based at least in part on the one or more common sequences and one or more codes;

determine a peak-to-average power ratio (PAPR) based at least in part on the one or more LTF sequences;

cause to send the preamble over the wireless communication channel;

determine a first PAPR value for a first stream of the one or more streams based at least in part on a first Hadamard code;

determine a second PAPR value for a second stream of the one or more streams based at least in part on a second Hadamard code;

sort the first PAPR value and the second PAPR value from low to high; and define a sequence for the one or more LTF sequences based at least in part on sorting the first PAPR value and the second PAPR value.

2. The device of claim 1, wherein the one or more codes include, at least in part, orthogonal codes associated with a P matrix.

3. The device of claim 1, wherein the one or more codes include, at least in part, a binary code of 1 and a binary code of −1 associated with a Hadamard matrix.

4. The device of claim 2, wherein computer-executable instructions to generate the one or more LTF sequences includes computer-executable instructions to generate a first one or more common sequences based at least in part on multiplying each row of the P matrix with the one or more common sequences.

5. The device of claim 4, wherein computer-executable instructions to generate a first one or more LTF sequences includes computer-executable instructions to multiply the first one or more common sequences with the one or more LTF sequences.

6. The device of claim 1, further comprising a transceiver configured to transmit and receive wireless signals.

7. The device of claim 6, further comprising one or more antennas coupled to the transceiver.

8. A non-transitory computer-readable medium storing computer-executable instructions which, when executed by a processor, cause the processor to perform operations comprising:

determining a wireless communication channel with a first device in accordance with a wireless communication standard, the wireless communication channel having one or more streams;

determining one or more common sequences between the one or more streams;

generating a preamble in accordance with a high efficiency communication standard;

generating one or more long training field (LTF) sequences included in the preamble based at least in part on the one or more common sequences and one or more codes;

determining a peak-to-average power ratio (PAPR) based at least in part on the one or more LTF sequences;

causing to send the preamble over the wireless communication channel;

wherein determining the PAPR comprises:

determining a first PAPR value for a first stream of the one or more streams based at least in part on a first Hadamard code; and determining a second PAPR value for a second stream of the one or more streams based at least in part on a second Hadamard code; and wherein the computer-executable instructions cause the processor to further perform operations comprising:

sorting the first PAPR value and the second PAPR value from low to high; and defining a sequence for the one or more LTF sequences based at least in part on sorting the first PAPR value and the second PAPR value.

9. The non-transitory computer-readable medium of claim 8, wherein the one or more codes include, at least in part, a binary code of 1 and a binary code of −1 associated with a Hadamard matrix.

10. The non-transitory computer-readable medium of claim 8, wherein the one or more codes include, at least in part, orthogonal codes associated with a P matrix.

11. The non-transitory computer-readable medium of claim 10, wherein generating the one or more LTF sequences comprises generating a first one or more common sequences based at least in part on multiplying each row of the P matrix with the one or more common sequences.

12. The non-transitory computer-readable medium of claim 11, wherein the computer-executable instructions to generate the one or more LTF sequences includes cause operations comprising multiplying the first one or more common sequences with the one or more LTF sequences.

13. A method comprising:

determining a wireless communication channel with a first device in accordance with a wireless communication standard, the wireless communication channel having one or more streams;

determining one or more common sequences between the one or more streams;

generating a preamble in accordance with a high efficiency communication standard;

generating one or more long training field (LTF) sequences included in the preamble based at least in part on the one or more common sequences and one or more codes;

determining a peak-to-average power ratio (PAPR) based at least in part on the one or more LTF sequences;

causing to send the preamble over the wireless communication channel;

wherein determining the PAPR comprises:

determining a first PAPR value for a first stream of the one or more streams based at least in part on a first Hadamard code; and determining a second PAPR value for a second stream of the one or more streams based at least in part on a second Hadamard code; and wherein the computer-executable instructions cause the processor to further perform operations comprising:

sorting the first PAPR value and the second PAPR value from low to high; and defining a sequence for the one or more LTF sequences based at least in part on sorting the first PAPR value and the second PAPR value.

14. The method of claim 13, wherein the one or more codes include, at least in part, orthogonal codes associated with a P matrix.

15. The method of claim 13, wherein the one or more codes include, at least in part, a binary code of 1 and a binary code of −1 associated with a Hadamard matrix.

16. The method of claim 14 further including generating a first one or more common sequences based at least in part on multiplying each row of the P matrix with the one or more common sequences.

* * * * *